United States Patent [19]

Matsui et al.

[11] Patent Number: 4,846,497
[45] Date of Patent: * Jul. 11, 1989

[54] AUTOMATIC SEATBELT SYSTEM FOR VEHICLE

[75] Inventors: Kenji Matsui; Tatsuo Yamashita; Hideki Tanaka; Kouji Sakakura, all of Aichi, Japan

[73] Assignee: Kabushiki-Kaisha Tokai-Rika-Denki-Seisakusho, Aichi, Japan

[ * ] Notice: The portion of the term of this patent subsequent to Apr. 19, 2005 has been disclaimed.

[21] Appl. No.: 127,278

[22] Filed: Dec. 1, 1987

Related U.S. Application Data

[63] Continuation-in-part of Ser. No. 883,649, Jul. 9, 1986, Pat. No. 4,738,470.

[30] Foreign Application Priority Data

Jul. 12, 1985 [JP] Japan ............................. 60-106660
Dec. 4, 1986 [JP] Japan .......................... 61-187321[U]

[51] Int. Cl.$^4$ ............................................. B60R 21/00
[52] U.S. Cl. .................................................... 280/804
[58] Field of Search ......................... 280/801, 802, 804

[56] References Cited

U.S. PATENT DOCUMENTS

| | | | |
|---|---|---|---|
| 4,302,031 | 11/1981 | Nishimura et al. | 280/804 |
| 4,324,419 | 4/1982 | Ueda | 280/804 |
| 4,444,417 | 4/1984 | Ueda | 280/804 |
| 4,502,710 | 3/1985 | Takada | 280/804 |
| 4,573,709 | 3/1986 | Kawai et al. | 280/801 |
| 4,738,470 | 4/1988 | Matsui et al. | 280/804 |

Primary Examiner—Charles A. Marmor
Assistant Examiner—Ross Weaver
Attorney, Agent, or Firm—Sixbey, Friedman, Leedom & Ferguson

[57] ABSTRACT

An automatic seatbelt system for a vehicle, which is designed to restrain the body of an occupant when an emergency situation of the vehicle occurs, has a slider which retains one end of a webbing and which is movable along a guide rail laid on the body of the vehicle between a position at which the webbing is fastened to the occupant's body (hereinafter referred to as a "webbing fastening position") and a position at which the webbing is unfastened therefrom (hereinafter referred to as a "webbing unfastening position"), and a continuous member for moving the slider between the above-described two positions. The continuous member and the slider are allowed to move relative to each other by a predetermined amount. In addition, a member is provided at an end of the guide rail on the side thereof which is closer to the webbing fastening position, the member being adapted such that, when the slider is moved to the webbing fastening position, the member inhibits the slider from moving toward the webbing unfastening position, whereas, when the continuous member moves from the webbing fastening position toward the webbing unfastening position, the member is actuated by virtue of the relative movement occurring between the continuous member and the slider so as to allow the slider to move toward the webbing unfastening position. Accordingly, when the slider is at the webbing fastening position, it is inhibited from moving along the guide rail.

13 Claims, 16 Drawing Sheets

F I G. 17
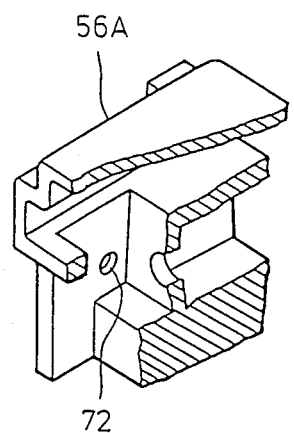

4,846,497

AUTOMATIC SEATBELT SYSTEM FOR VEHICLE

CONTINUITY

This is a continuation-in-part application of U.S. patent application Ser. No. 883,649, filed on July 9, 1986 now U.S. Pat. No. 4,718,470.

BACKGROUND OF THE INVENTION

1. Field of the Invention

The present invention relates to a seatbelt system for a vehicle designed to restrain the body of an occupant when an emergency situation of the vehicle occurs. More particularly, the present invention pertains to an automatic seatbelt system for a vehicle which enables a webbing to be automatically fastened to the body of an occupant after seating himself in a seat provided on the vehicle.

2. Description of the Related Art

There are various types of automatic seatbelt system for a vehicle which are adapted to enable a webbing to be automatically fastened to the body of an occupant. As one type of such automatic seatbelt system, a structure has already been proposed wherein a slider is provided in such a manner as to be movable along a guide rail laid on the body of a vehicle, and this slider is activated by drive means so as to move a webbing which is retained at one end thereof by the silder.

The guide rail employed in this system is arranged such that an end portion thereof which is closer to the rear end of the vehicle is terminated after being bent so as to extend downward in the substantially vertical direction along a center pillar, thereby allowing the guide rail to reliably carry the tension generated in the webbing by the inertia which acts on the occupant's body when an emergency situation of the vehicle occurs. The guide rail arranged as described above needs retainer means for retaining the slider in such a manner that the slider is inhibited from moving toward the ceiling of the vehicle along the vertically extended portion of the guide rail when the vehicle overturns.

Seatbelt systems having such retainer means have already been devised wherein a sensor such as a pendulum for detecting overturn of the vehicle is provided, and the movement of the slider is inhibited when this sensor is activated (e.g., Japanese Patent Publication No. 15716/1985). This type of retainer means suffers, however, from the problem that, since a sensor such as a pendulum projects from the guide rail, it is necessary to form a bore in the center pillar for receiving such projecting sensor structure or provide a raised portion on the center pillar which protrudes into the compartment of the vehicle.

SUMMARY OF THE INVENTION

In view of the above-described circumstances, it is a primary object of the present invention to provide an automatic seatbelt system which is so designed that the retainer means, which is adapted to inhibit the movement of the slider when the vehicle overturns, has a simplified arrangement and a reduced size.

To this end, the present invention provides an automatic seatbelt system for a vehicle which comprises: a guide rail laid on the body of the vehicle; a slider retaining a webbing and adapted to be movable along the guide rail between a position at which the webbing is fastened to the body of an occupant (hereinafter referred to as the "webbing fastening position") and a position at which the webbing is unfastened therefrom (hereinafter referred to as the "webbing unfastening position"); drive means adapted to move along the guide rail in such a manner as to apply driving force to the slider, the drive means being movable relative to the slider by a predetermined amount along the guide rail; and retainer means adapted such that, in response to the movement of the slider to the webbing fastening position, the retainer means is brought into a first state wherein it can inhibit the movement of the slider toward the webbing unfastening position, and in response to the above-described relative movement which occurs when the drive means moves toward the webbing unfastening position from the webbing fastening position, the retainer means is brought into a second state wherein it allows the slider to move toward the webbing unfastening position.

By virtue of the above-described arrangement, when the slider is at the webbing fastening position, it is inhibited from moving along the guide rail. Thus, the retainer means need not be provided with any special sensor means such as an acceleration sensor, so that the arrangement of the retainer means is simplified, and the size of the means is reduced.

BRIEF DESCRIPTION OF THE DRAWINGS

FIG. 17 is a cutaway perspective view of a housing of the fifth embodiment.

DESCRIPTION OF THE PREFERRED EMBODIMENTS

The present invention will be described hereinunder in detail with reference to the accompanying drawings.

Figure 1:
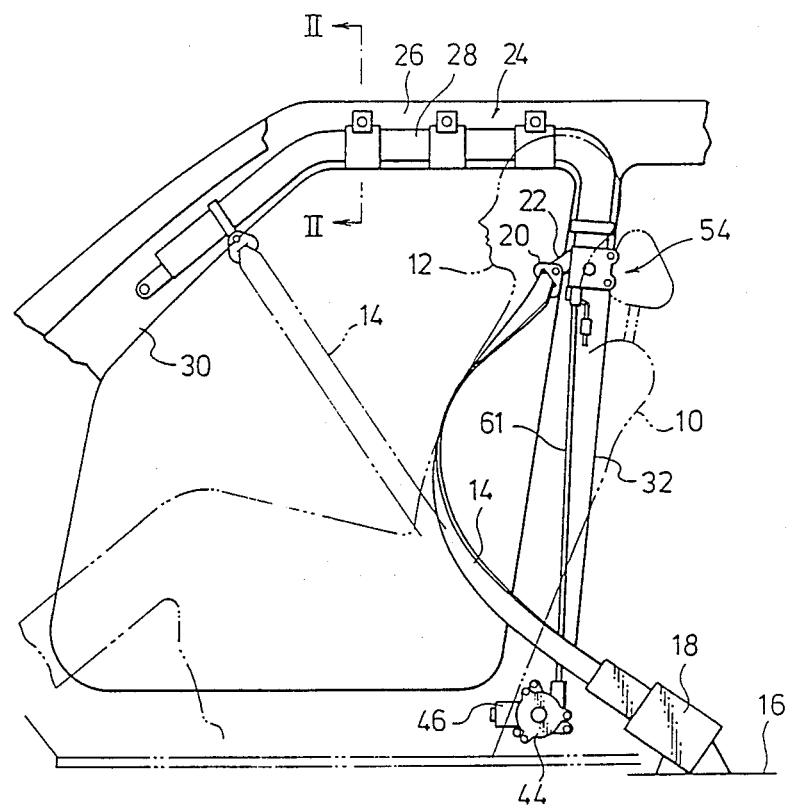
FIG. 1 is a fragmentary side view of a vehicle to which a first embodiment of the automatic seatbelt system according to the present invention is applied, as viewed from the inside of the vehicle.

FIG. 1 is a fragmentary side view of a vehicle to which a first embodiment of the seatbelt system according to the present invention is applied, as viewed from the inside of the vehicle.

The arrangement is such that, when an occupant 12 is seated in a seat 10 which is on the right-hand side of the vehicle with respect to the forward direction, his body is automatically fastened with a webbing 14. The webbing 14 is wound up from one end thereof into a retractor 18 by means of a predetermined biasing force, the retractor 18 being secured to a floor member 16 in the substantially central portion of the vehicle. The retractor 18 incorporates an inertia type lock mechanism adapted to instantaneously stop the webbing 14 from being unwound when an emergency situation of the vehicle occurs.

The other end of the webbing 14 is retained by a slider 22 through an anchor plate 20. The slider 22 is adapted to be movable in the longitudinal direction of the vehicle along a guide rail 24. The guide rail 24 includes a guide rail main body 28. The central portion of the main body 28 is disposed horizontally along a roof side member 26 which constitutes a part of the side wall of the vehicle body. The forward end portion of the guide rail main body 28 is slanted along a front pillar 30 and secured thereto.

The end portion of the guide rail main body 28 on the side thereof which is closer to the rear end of the vehicle is bent at substantially right angles so as to extend toward the lower side of the vehicle, and secured to a center pillar 32.

Figure 2:
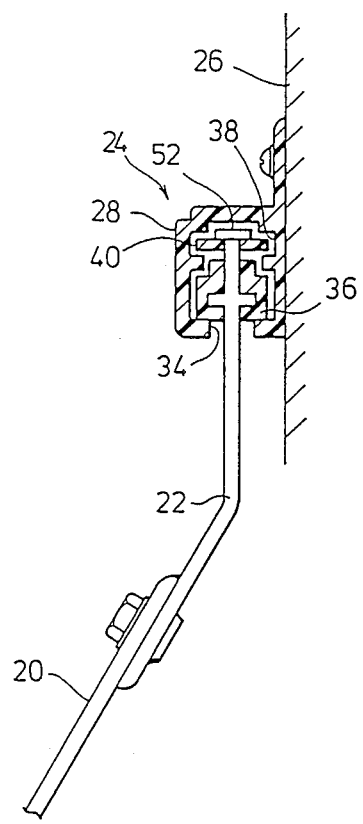
FIG. 2 is a sectional view taken along the line II—II in FIG. 1, which shows the slider having moved to the central portion of the guide rail.

As shown in FIG. 2, the guide rail main body 28 has a groove 34 which opens toward the lower side of the vehicle, thus having a substantially U-shaped cross-section as a whole. The intermediate portion of the groove 34 in the depthwise direction thereof is enlarged in width so as to receive an enlarged-width portion 36 which is formed on the intermediate enlarged portion of the slider 22. This enlarged-width portion 36 enables the slider 22 to move smoothly within the guide rail main body 28 in the longitudinal direction thereof, that is, in the longitudinal direction of the vehicle. In addition, the enlarged-width portion 36 is adapted to carry the tension applied to the webbing 14 by the occupant when the vehicle is in a normal state so that the slider 22 does not come off the guide rail main body 28.

The bottom portion of the groove 34 in the main body 28 is also enlarged in width to define a tape accommodating groove 38 which slidably guides a flexible tape 40, serving as drive means, in the longitudinal direction of the guide rail 24.

Figure 4:
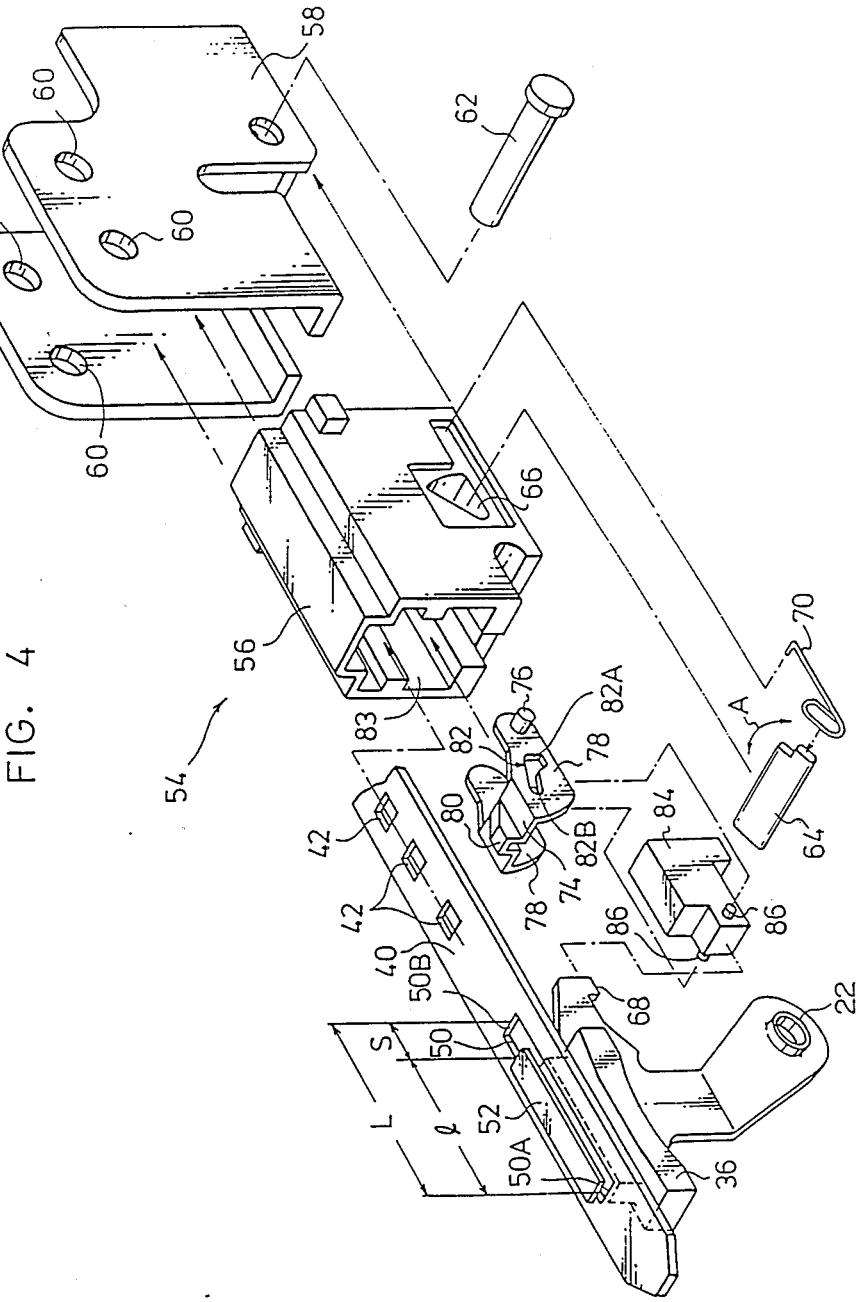
FIG. 4 is an exploded perspective view of an essential part of the arrangement shown in FIG. 3.
Figure 5:
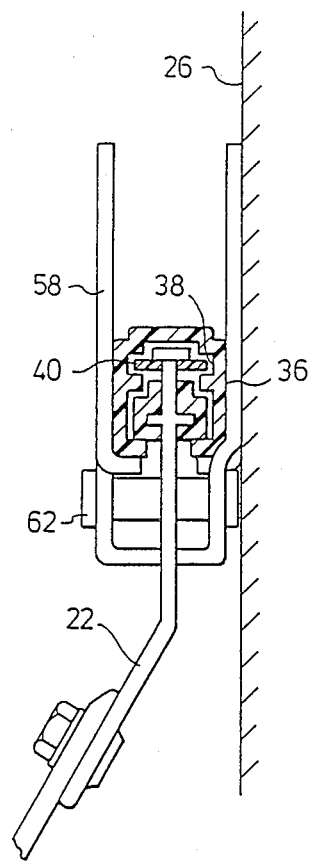
FIG. 5 is a sectional view taken along the line V—V in FIG. 3, which particularly shows the retainer means with the housing removed.

The flexible tape 40 is, as also shown in FIG. 4, made from a continuous thick-walled synthetic resin material. A plurality of openings 42 are formed in the tape 40 in such a manner that they are arranged in a row at a predetermined regular spacing along the longitudinal axis of the tape 40. These openings 42 are adapted to engage with a sprocket wheel (not shown) accommodated within a housing 44 which is disposed on the lower part of the center pillar 32 as shown in FIG. 1, so that the rotational force from a motor 46 is transmitted to the tape 40 through the engagement between the sprocket wheel and the openings 42, thus causing the tape 40 to move along the longitudinal axis thereof.

Since the enlarged-width portion 36 which mainly carries the load applied from the slider 22 is disposed below the tape accommodating groove 38 within the guide rail 24 as described above, even when a relatively large load is applied from the slider 22, there is no fear of the flexible tape 40 and the tape accommodating groove 38 being deformed to a substantial degree, and it is therefore possible to prevent the tape 40 from falling into an operation failure.

As shown in FIG. 4, an elongated opening 50 which has a longer longitudinal dimension than that of the openings 42 is formed in an end portion of the flexible tape 40 on the side thereof which is closer to the front end of the vehicle. The elongated opening 50 receives a portion of the slider 22 which is intermediate between the head portion 52 and the enlarged-width portion 36. In consequence, when the flexible tape 40 moves in the longitudinal direction of the vehicle along the guide rail 24, the slider 22 is driven by the tape 40 and can move in the longitudinal direction of the vehicle along the guide rail 24 together with the tape 40. As shown in FIG. 1, when the slider 22 is moved to the forward end of the guide rail 24, the slider 22 brings the webbing 14 to a position at which the webbing 14 is unfastened from the occupant's body as shown by the imaginary line (this position being hereinafter referred to as a "webbing unfastening position"), whereby a space for the occupant 12 to enter and leave the vehicle can be defined between the webbing 14 and the seat 10. When the slider 22 is moved to the rear end of the guide rail 24 as shown by the solid line in FIG. 1, the webbing 14 is brought to a position at which it is fastened to the occupant's body (this position being hereinafter referred to as a "webbing fastening position"), whereby the occupant 12 can automatically be fastened with the webbing 14.

As shown in FIG. 4, the longitudinal dimension L of the elongated opening 50 is made larger than the longitudinal dimension l of the head portion 52, so that, when the head portion 52 abuts against either the longitudinal edge 50A or 50B of the elongated opening 50 on the side thereof which is closer to the front or rear end of the vehicle, respectively, a space or play S is defined between the head portion 52 and the other of the two longitudinal edges of the opening 50. Accordingly, the flexible tape 40 and the slider 22 are movable relative to each other by an amount corresponding to the length of the space S, so that, even when the tape 40 is started to move, the slider 22 is not moved until the space or play S has disappeared.

Referring to FIGS. 3 to 6, a retainer means 54 is disposed on the vertically extended portion of the guide rail 24 which is defines the rear end portion thereof. The retainer means 54 includes a hollow housing 56 which is disposed adjacent to the lower end of the guide rail main body 28 and rigidly secured to the center pillar 32 through a reinforcing bracket 58. This bracket 58 has a substantially U-shaped cross-section so that it covers the forward end surface and two lateral side surfaces of the housing 56. The bracket 58 has mounting bores 60 provided in the end portion of each of the side walls thereof, and mounting bolts are respectively received through these bores 60 to rigidly secure the bracket 58 to the center pillar 32.

It should be noted that the housings 56 and 44 are connected together by a guide tube 61 which tightly accommodates the flexible tape 40.

Figure 3:
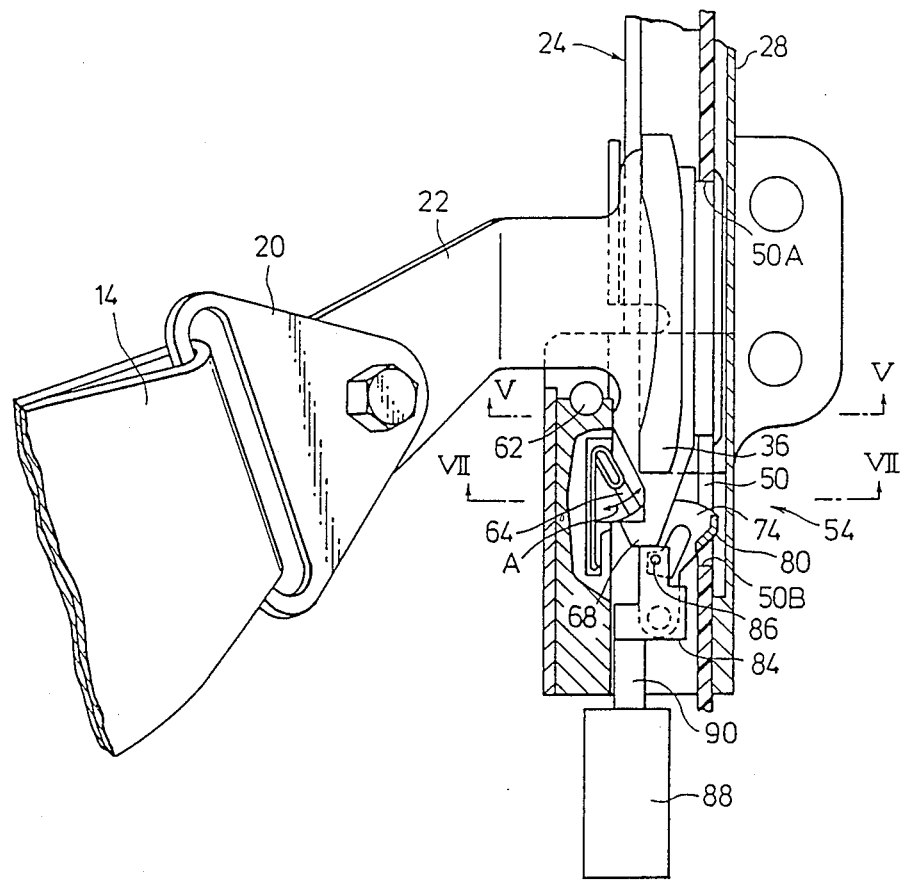
FIG. 3 is a partially sectioned side view of an essential part of the first embodiment, which particularly shows the retainer means.

As shown in FIGS. 3 and 4, an anchor pin 62 is secured at both end portions thereof to the bracket 58 in such a manner that the anchor pin 62 opposes the intermediate enlarged portion of the slider 22 having the enlarged-width portion 36 formed thereon when the slider 22 is stopped at the webbing fastening position. Thus, when a relatively large tension acts on the webbing 14 at the webbing fastening position so as to force the slider 22 to come out of the groove 34 in the guide rail main body 28, the anchor pin 62, which is located on the side of the intermediate enlarged portion of the slider 22 which is closer to the front end of the vehicle, engages with the enlarged-width portion 36, thereby preventing the slider 22 from coming off the guide rail main body 28.

A latch pawl 64 which is used as a locking apparatus is disposed within the housing 56 in such a manner that the pawl 64 opposes the enlarged-width portion 36 of the slider 22 when stopped at the webbing fastening position. This pawl 64 is received in a support bore 66 with a triangular cross-section which extends through the housing 56 in the lateral direction of the vehicle, and adapted to be pivotal in the direction of the arrow A about one vertex of the triangular support bore 66.

Figure 8:
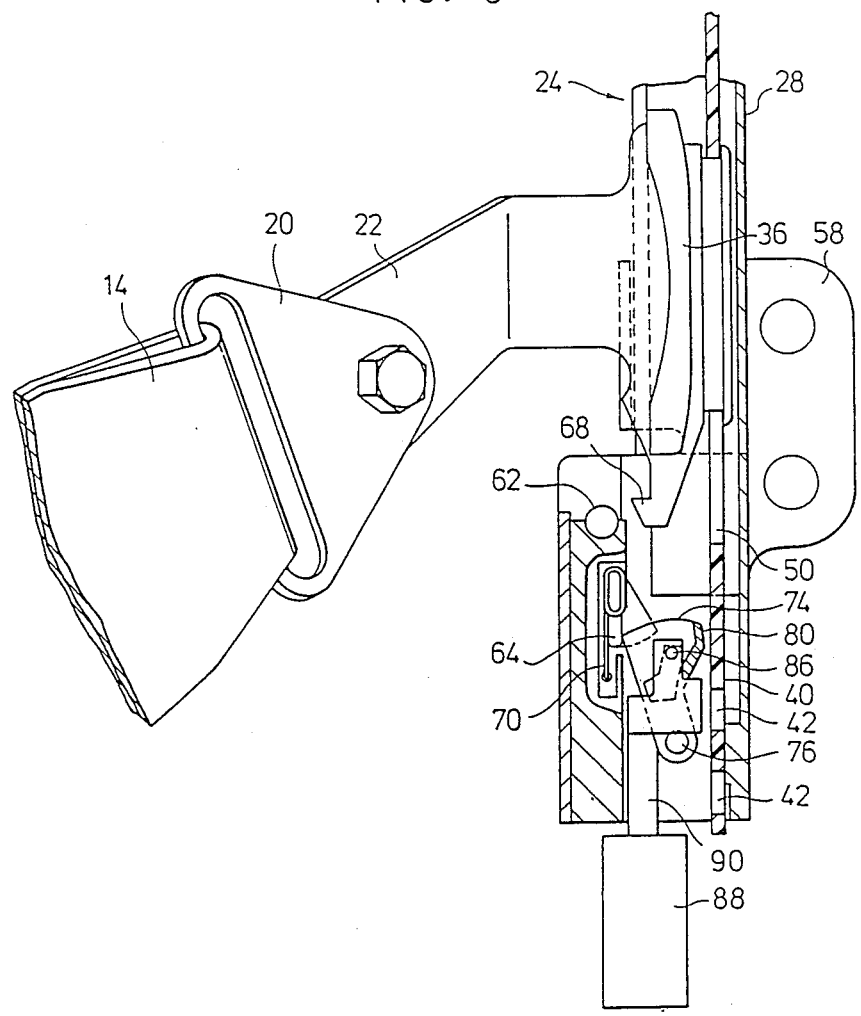
FIG. 8 is a view employed to explain the operation of the essential part of the first embodiment shown in FIG. 3.

More specifically, when the pawl 64 pivots maximumly within the triangular support bore 66 counterclockwise as viewed in FIG. 3, the distal end of the pawl 64 is interposed in the locus of movement of a hook portion 68 provided at the distal end portion of the enlarged-width portion 36, thereby making it possible to inhibit the slider 22 from moving toward the upper side of the vehicle. When the pawl 64 moves maximumly clockwise as shown in FIG. 8, the distal end of the pawl 64 is withdrawn from the locus of movement of the hook portion 68, thereby allowing the slider 22 to move upward. For this purpose, the pawl 64 is baised by a torsion coil spring 70 so as to be brought into the state shown in FIG. 3, that is, in the state wherein the pawl 64 is interposed in the locus of movement of the hook portion 68. Thus, the pawl 64 and the torsion coil spring 70 constitute in combination an engagement section for engagement with the hook portion 68.

Figure 6:
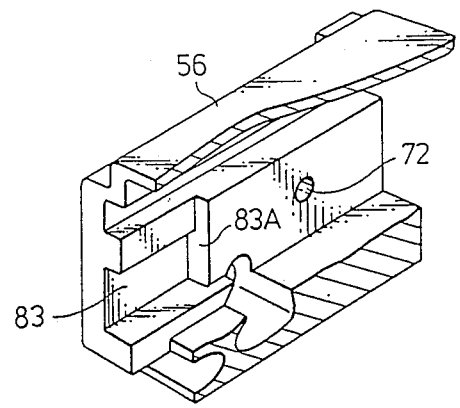
FIG. 6 is a partially cutaway perspective view of the housing of the retainer means.
Figure 7:
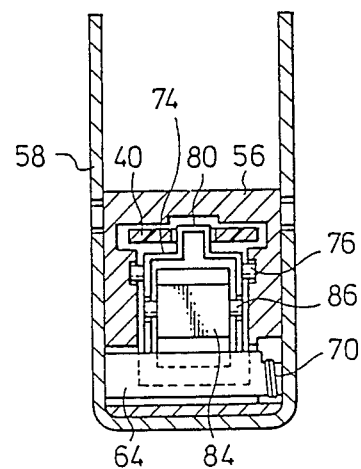
FIG. 7 is a sectional view taken along the line VII—VII in FIG. 3.

Support bores 72 are formed in the housing 56 as shown in FIG. 6, and support shafts 76 of a ratchet member 74 shown in FIG. 4 are respectively received in the support bores 72. This ratchet member 74 is provided for the purpose of controlling the pawl 64. Two lateral end portions of the ratchet member 74 are bent at right angles so as to extend parallel with each other, thereby defining a pair of leg plate portions 78. The support shafts 76 are coaxially formed on the leg plate portions 78, respectively, so as to project in opposite directions. Accordingly, in assembly, the ratchet member 74 is inserted into the housing 56 while the leg plate portions 78 are being elastically deformed toward each other, whereby the support shafts 76 enter the corresponding support bores 72 by virtue of the restoring force of the leg plate portions 78, and the ratchet member 74 is thereby pivotally supported within the housing 56.

The ratchet member 74 has a pawl portion 80 projecting from the central portion thereof in such a manner that the pawl portion 80 is able to enter the elongated opening 50 in the flexible tape 40. When the pawl portion 80 of the ratchet member 74 is within the elongated opening 50, the pawl 64 is interposed in the locus of movement of the hook portion 68 as shown in FIG. 3. However, when the pawl portion 80 is out of the elongated opening 50 as shown in FIG. 8, the ratchet member 74 causes the pawl 64 to move against the biasing force from the torsion coil spring 70 so as to be withdrawn from the locus of movement of the hook portion 68.

The pawl portion 80 of the ratchet member 74 is disposed in such a manner that it is able to enter the elongated opening 50 when the flexible tape 40 moves to the position shown in FIG. 3 and the slider 22 consequently reaches the webbing fastening position. Accordingly, when the tape 40 moves toward the webbing unfastening position, the pawl portion 80 is caused by the rear edge 50B of the elongated opening 50 to pivot counterclockwise as viewed in FIG. 3 about the support shafts 76, thus causing the pawl 64 to move the retraction position shown in FIG. 8 before the tape 40, which is moving toward the webbing unfastening position, makes the space or play S disappear and causes the slider 22 to be started to move.

Guide bores 82 are respectively provided in the leg plate portions 78 of the ratchet member 74. The guide bores 82 respectively receive pins 86 projecting from both sides of a slide block 84 which is received in slide grooves 83 formed inside the housing 56 and which is movable only in directions parallel to the direction of movement of the flexible tape 40. More specifically, the slide block 84 is disposed between the pair of leg plate portions 78, and the pins 86 which coaxially project in opposite directions are respectively received in the guide bores 82 from the inside of the leg plate portions 78.

The slide block 84 is arranged such that, when the slider 22 reaches the webbing fastening position, the slide block 84 is pressed and moved by the hook portion 68 as shown in FIG. 3, thus causing the pins 86 to enter larger-width portions 82A (see FIG. 4) of the guide bores 82, respectively. In this state, the pins 86 allow the ratchet member 74 to pivot from the position shown in FIG. 3 to the position shown in FIG. 8.

When the slider 22 is moved to the webbing unfastening position, the slide block 84 is, as shown in FIG. 8, released from the contact with the hook portion 68 and therefore pushed out toward the slider 22 by the action of a projecting detector element 90 of a limit switch 88 which is secured to the housing 56. This projecting detector element 90 is constantly biased so as to project from the limit switch 88 by the force from a resilient member (not shown) which is mounted inside the limit switch 88. Thus, when the detector element 90 is in its projecting position, the fact that the slider 22 is not at the webbing fastening position can be detected, whereas, when the detector element 90 is withdrawn into the limit switch 88 as shown in FIG. 3, it is possible to detect the fact that the slider 22 is at the webbing fastening position.

Accordingly, when the slide block 84 is in the state shown in FIG. 8, it is pushed out by the projecting detector element 90, causing the pins 86 to enter smaller-width portions 82B of the guide bores 82, respectively. In consequence, the ratchet member 74 is pivoted about the support shafts 76 and held in the state shown in FIG. 8.

More specifically, the ratchet member 74 allows the pawl 64 to be held in a state wherein it is withdrawn from the locus of movement of the hook portion 68 with a margin and the pawl portion 80 to be held in a state wherein it is withdrawn from the locus of movement of the flexible tape 40 with a margin. Therefore, in the state shown in FIG. 8, when the flexible tape 40 moves along the longitudinal axis thereof, it is prevented from contacting the pawl portion 80, and when the slider 22 moves toward the webbing unfastening position, it is prevented from contacting the pawl 64. Thus, the ratchet member 74, the slide block 84 and the projecting detector element 90 constitute in combination a release section which allows the pawl 64 to be separated from the hook portion 68.

In order to ensure the required movement of each of the associated portions, the larger-width portion 82A of each of the guide bores 82 in the ratchet member 74 has a dimension which allows the pin 86 to move therein with a margin.

In addition, the slider 22 is arranged such that the enlarged-width portion 36 is stopped by abutting against the inner ends 83A of the guide grooves 83 formed inside the housing 56. A cushioning material such as rubber may be interposed between the enlarged-width portion 36 and the end portions 83A.

The following is a description of the operation of the above-described embodiment.

After seating himself in the seat 10, the occupant 12 actuates a manually-operated switch. Alternatively, the fact that the occupant 12 enters the vehicle and seats himself in the seat 10 is detected by switch means such as a switch adapted to detect whether the door is open or closed and a switch provided in the seat 10. In consequence, the motor 46 is activated to move the flexible tape 40 toward the rear end of the vehicle. This movement of the tape 40 causes the webbing 14 to move from the webbing unfastening position shown by the imaginary line in FIG. 1 to the webbing fastening position shown by the solid line so as to be automatically fastened to the body of the occupant 12.

The slider 22 is driven to move toward the rear end of the vehicle while abutting against the forward edge 50A of the elongated opening 50 formed in the tape 40 with a space or play S defined between the head portion 52 and the rear edge 50B of the opening 50.

Near the stroke end of the slider 22, it moves downward from the position shown in FIG. 8. In consequence, the hook portion 68 of the slider 22 forces the projecting detector element 90 into the limit switch 88 through the slide block 84 as shown in FIG. 3. Thus, the limit switch 88 detects the fact that the slider 22 has reached the webbing fastening position, and control means (not shown) suspends the rotation of the motor 46.

The slide block 84 thus moved by the hook portion 68 causes the pins 86 to move to the larger-width portions 82A from the smaller-width portions 82B, respectively, thus allowing the ratchet member 74 to pivot. In consequence, the pawl 64, which has been moved to and held at the retraction position by the ratchet member 74, causes the ratchet member 74 to pivot clockwise by virtue of the biasing force from the torsion coil spring 70, thereby bringing the ratchet member 74 into the state shown in FIG. 3. At the same time, the pawl 64 is interposed in the locus of movement of the hook portion 68 and enters the recess on the side of the hook portion 68 which is closer to the upper side of the vehicle as shown in FIG. 3. Accordingly, the slider 22 is inhibited from moving toward the upper side of the vehicle. In addition, the ratchet member 74 pivots clockwise as viewed in FIG. 3, and the pawl portion 80 enters the space S defined in the elongated opening 50.

When the vehicle is in a normal state, the webbing 14 can be unwound from the retractor 18; therefore, the occupant 12 can assume any desired driving posture.

When the vehicle runs into an emergency situation, the retractor 18 stops the webbing 14 from being unwound, so that the body of the occupant 12 is restrained by the webbing 14.

In an emergency situation of the vehicle, a relatively large tension is generated in the webbing 14 by the inertia which acts on the occupant's body, and transmitted to the slider 22 through the anchor plate 20. However, since the anchor pin 62 is disposed in opposing relation to the slider 22, the slider 22 is reliably supported by the vehicle body through the bracket 58.

When the vehicle overturns, the hook portion 68 of the slider 22 is also inhibited by the pawl 64 from moving toward the upper side of the vehicle. There is therefore no fear of the slider 22 moving toward the ceiling of the vehicle.

In the case where the occupant 12 leaves the vehicle upon the completion of a normal drive, when he opens the door, the control means activates the motor 46 to rotate in reverse.

Accordingly, the flexible tape 40 is moved toward the front end of the vehicle within the guide rail main body 28. At this time, even when the tape 40 moves from the position shown in FIG. 3, the slider 22 is not moved until the rear edge 50B of the elongated opening 50 abuts against the slider 22. Before the rear edge 50B abuts against the slider 22, the relative movement between the tape 40 and the slider 22 causes, through the opening 50, the ratchet member 74 to pivot counterclockwise as viewed in FIG. 3 about the support shafts 76. This movement of the ratchet member 74 causes the pawl 68 to pivot from the position shown in FIG. 3 to the position shown in FIG. 8 so as to be withdrawn from the locus of movement of the hook portion 68. Accordingly, the slider 22 is released and allowed to move toward the front end of the vehicle together with the flexible tape 40 when the rear edge 50B of the elongated opening 50 abuts against the slider 22 and thereby causes the latter to be started to move.

When the slider 22 which is driven by the tape 40 reaches the front end of the vehicle as shown in FIG. 1, a limit switch (not shown) is activated so as to suspend the rotation of the motor 46, thereby allowing the webbing 14 to be automatically unfastened from the body of the occupant 12.

During such movement of the flexible tape 40, the slide block 84, which has been released from the contact with the slider 22, is pushed up by the projecting detector element 90 of the limit switch 88 as shown in FIG. 8. Consequently, the pawl portion 80 of the ratchet member 74 is separated from the tape 40, and there is therefore no fear of the pawl portion 80 contacting the edges of the openings 42 to generate noise when the tape 40 is moved.

In addition, the ratchet member 74 holds the pawl 64 in a state wherein it is withdrawn from the locus of movement of the hook portion 68 with a margin. There is therefore no risk of the pawl 64 interfering with the hook portion 68 when the slider 22 is moved.

When the occupant 12 opens the door thereafter in order to re-enter the vehicle, the same operation as that which has already been described takes place. Namely, after the occupant 12 has been seated, the slider 22 is moved toward the rear end of the vehicle again, thereby allowing the webbing 14 to be automatically fastened to the occupant's body.

Figure 9:
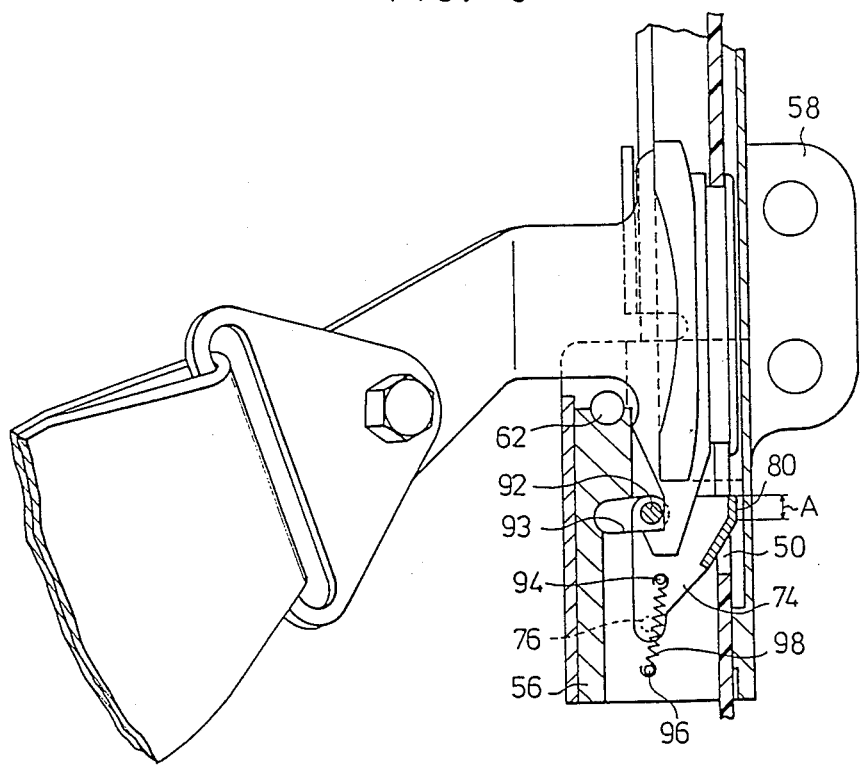
FIG. 9 is a partially sectioned side view of an essential part of a second embodiment of the present invention, which particularly shows retainer means employed in the second embodiment.
Figure 10:
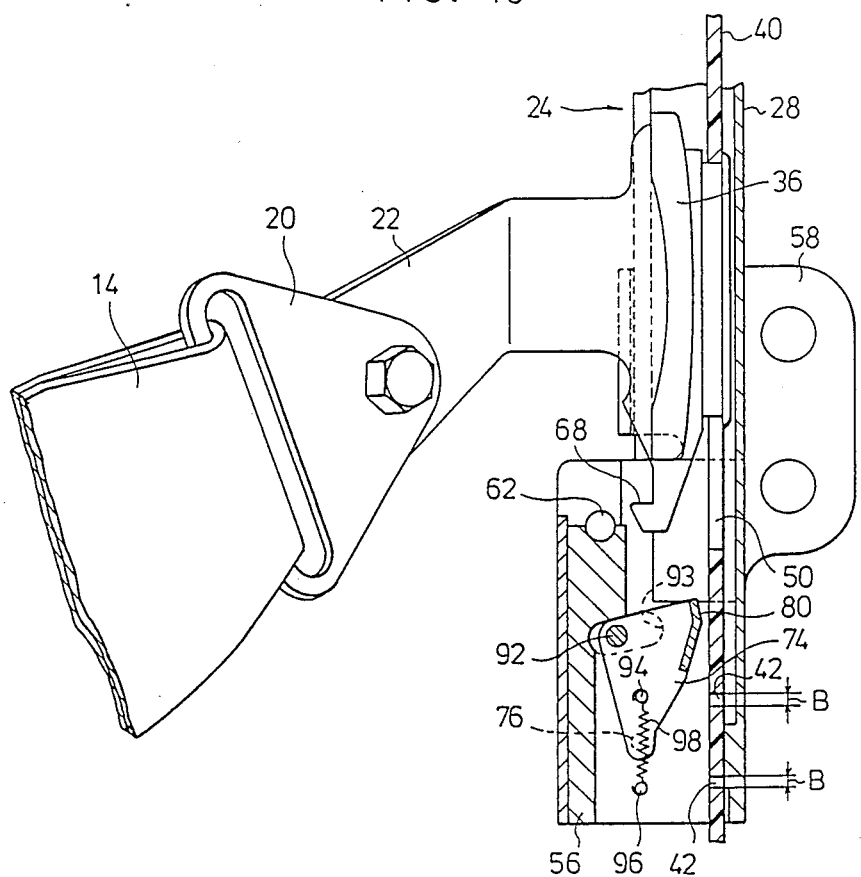
FIG. 10 is a view employed to explain the operation of the retainer means shown in FIG. 9.
Figure 11:
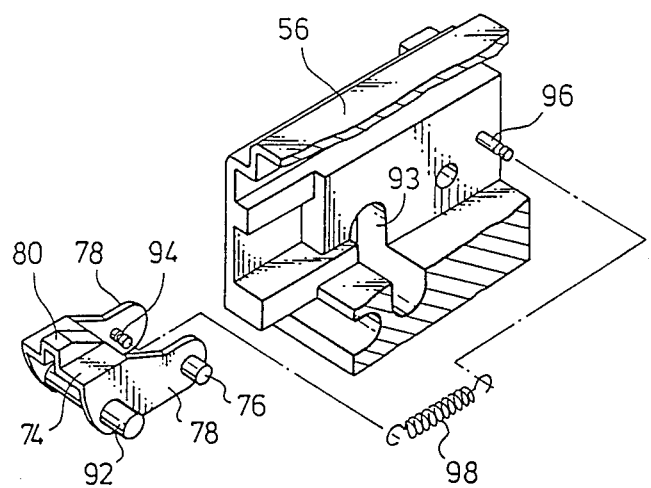
FIG. 11 is a partially cutaway perspective view of the retainer means of the second embodiment.

Referring next to FIGS. 9 to 11, there is shown a second embodiment of the present invention. In this embodiment, the slide block 84 and the pawl 64 which are employed in the above-described embodiment are omitted, and a pin 92 is stretched between the leg plate portions 78 of the ratchet member 74 so as to serve as a member similar to the pawl 64 in the first embodiment. Both ends of the pin 92 project from the leg plate portions 78 and are respectively received in slots 93 formed in the housing 56, thereby limiting the angle of rotation of the ratchet member 74.

In addition, a spring retainer pin 94 projects from the inner side of each of the leg plate portions 78 of the ratchet member 74, and a tension coil spring 98 is stretched between the pin 94 and a spring retainer pin 96 which projects from each of the opposing inner sides of the housing 56. This tension coil spring 98 is a turnover spring which causes the ratchet member 74 to perform snap action. More specifically, when the axis of the tension coil spring 98 is positioned closer to the flexible tape 40 than the prolongation of the axes of the support shafts 76, the spring 98 biases the ratchet member 74 so as to pivot clockwise as viewed in FIG. 9, whereas, when the axis of the spring 98 is shifted passing the prolongation of the axes of the support shafts 76 in a direction in which it is separated from the tape 40, the spring 98 biases the ratchet member 74 so as to pivot counterclockwise as viewed in FIG. 9, thereby allowing the ratchet member 74 to pivot to the position shown in FIG. 10.

In addition, when the pawl portion 80 of the ratchet member 74 which is within the elongated opening 50 as shown in FIG. 9 is caused to pivot counterclockwise as viewed in FIG. 8 by the front edge 50A of the opening 50 when the flexible tape 40 is moved, the ratchet member 74 causes the axis of the tension coil spring 98 to pass its neutral point defined by the prolongation of the axes of the support shafts 76 and move to the other side, thereby allowing the ratchet member 74 to move to the position shown in FIG. 10 by the action of the spring 98.

In the case where the ratchet member 74 is maximumly pivoted counterclockwise by the biasing force from the tension coil spring 98 as shown in FIG. 10, when the slider 22 is moved to the webbing fastening position, the enlarged-width portion 36 of the slider 22 abuts against the ratchet member 74 and causes the latter to pivot clockwise as viewed in FIG. 10. In consequence, the axis of the tension coil spring 98 passes the prolongation of the axes of the support shafts 76, and this also forces the ratchet member 74 to pivot clockwise, thus allowing the pawl portion 80 to enter the elongated opening 50.

Accordingly, in this embodiment also, when the slider 22 is at the webbing fastening position as shown in FIG. 9, the pawl portion 80 of the ratchet member 74 is within the elongated opening 50, and the pin 92 is disposed on the side of the hook portion 68 which is closer to the upper side of the vehicle, whereby it is possible to prevent the slider 22 from moving accidentally or undesirably. When the flexible tape 40 is moved toward the webbing unfastening position, the pawl portion 80 is pushed down by the rear edge 50B of the elongated opening 50 to the position shown in FIG. 10. Therefore, the pin 92 is withdrawn from the locus of movement of the hook portion 68 before the space or place S defined in the elongated opening 50 of the tape 40 disappears and the tape 40 consequently causes the slider 22 to be started to mobe, thereby allowing the slider 22 to move. Since, in this sate, the pawl portion 80 has already been separated from the tape 40 at an adequate spacing, there is no fear of the pawl portion 80 abutting against the edges of the openings 42 in the take 40.

It should be noted that the tension coil spring 98 in this embodiment may be disposed in such a manner that it constantly biases the ratchet member 74 so as to pivot clockwise as viewed in FIGS. 9 and 10. In such case, the width A of the pawl portion 80 is made larger than the width B of the openings 42 in the tape 40 so that there is no fear of the pawl portion 80 entering the openings 42 to generate noise when the flexible tape 40 is moved.

Figure 12:
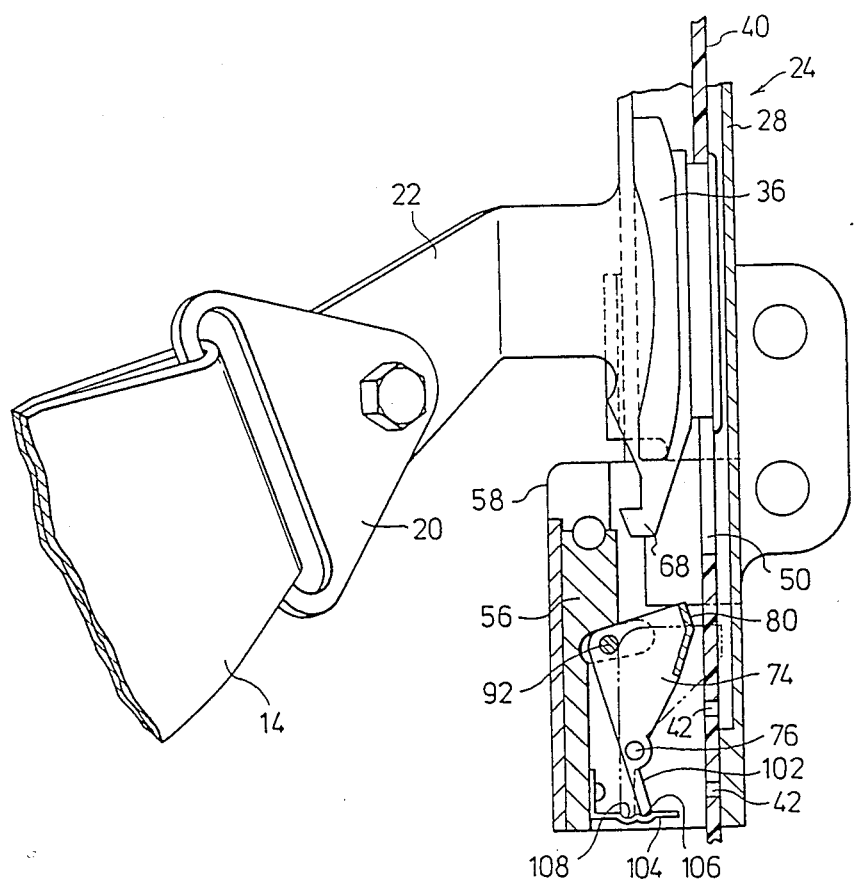
FIG. 12 is a partially sectioned side view of an essential part of a third embodiment of the present invention, which particularly shows retainer means employed in the third embodiment.

Referring next to FIG. 12, there is shown a third embodiment of the present invention. The ratchet member 74 in this embodiment has an arrangement substantially similar to that in the second embodiment. In this embodiment, however, the ratchet member 74 has an arm 102 which projects from a position in the vicinity of the support shafts 76 so as to oppose a leaf spring 104 which is secured at one end thereof to the housing 56. A pair of recesses 106 and 108 are formed in the intermediate portion of the leaf spring 104 in such a manner that each of the recesses 106 and 108 is able to accommodate the distal end of the arm 102, thereby controlling the pivoting motion of the ratchet member 74.

Thus, when the ratchet member 74 abuts against the enlarged-width portion 36 of the slider 22 which is moved downward, the ratchet member 74 is able to move from the position shown by the solid line in FIG. 12 in which the pin 92 is withdrawn from the locus of movement of the hook portion 68 to the position shown by the phantom line in which the pawl portion 80 is within the elongated opening 50 in the flexible tape 40. Thus, the ratchet member 74 in this embodiment performs an action similar to that in the above-described embodiments.

In this embodiment, when the ratchet member 74 which is in the position shown by the imaginary line is pivoted counterclockwise to come close to the position shown by the solid line, the arm 102 of the ratchet member 74 is biased by the leaf spring 104 so as to turn and enter the recess 106 thanks to the configuration of the recess 106. In consequence, the arm 102 is moved into the recess 106. Thus, when the ratchet member 74 is in the position shown by the solid line, the pawl portion 80 can be held in a state wherein it is separated from the flexible tape 40.

Figure 13:
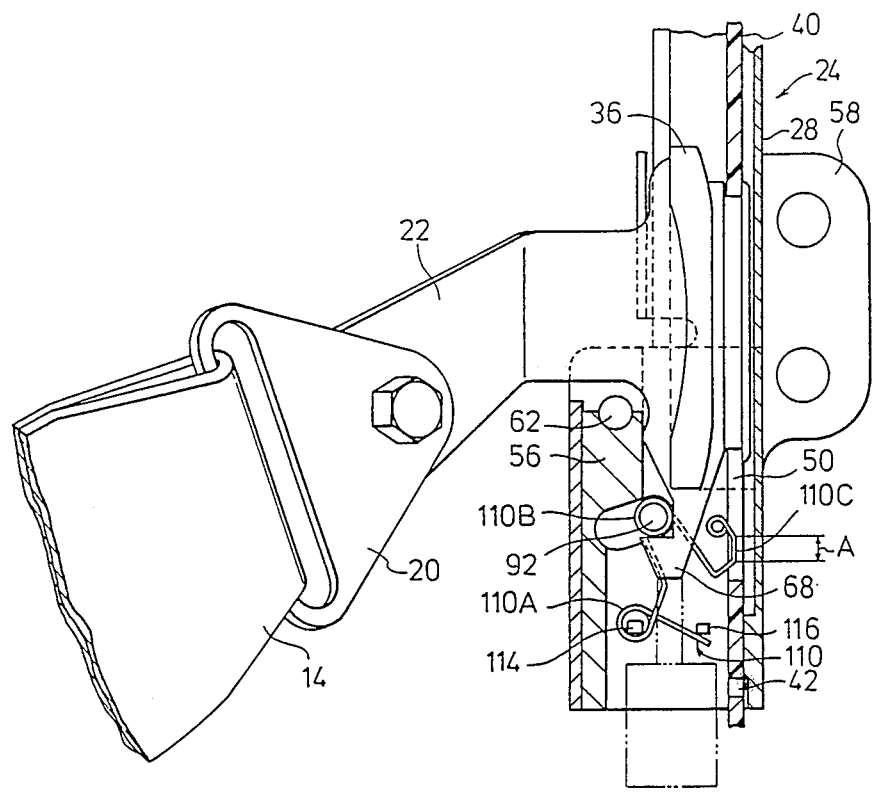
FIG. 13 is a partially sectioned side view of an essential part of a fourth embodiment of the present invention, which particularly shows retainer means employed in the fourth embodiment.

FIG. 13 shows a fourth embodiment of the present invention.

In this embodiment, a torsion coil spring 110 serves as both the ratchet member 74 and the pawl 64 in the first embodiment.

More specifically, a coil portion 110A formed on the intermediate portion of the spring 110 is rotatably supported on a spring retainer projection 114 which is rigidly secured to the housing 56. One end portion of the spring 110 is retained by a retainer projection 116. A coil portion 110B which is adjacent to the coil portion 110A is disposed in such a manner as to hold the pin 92. The other end portion of the spring 110 is bent to define a ratchet portion 110C which serves as a member similar to the ratchet member 74 in the above-described embodiments.

Therefore, in this embodiment, when the slider 22 is in the position shown in FIG. 13, the ratchet portion 110C is within the elongated opening 50, and the pin 92 is interposed in the locus of movement of the hook portion 68. When, in this state, the slider 22 is moved toward the webbing unfastening position, the ratchet portion 110C is expelled from the elongated opening 50. In consequence, the torsion coil spring 110 is forced to pivot counterclockwise as viewed in FIG. 13 about the coil portion 110A so as to be elastically deformed, thereby causing the coil portion 110B and the pin 92 to be withdrawn from the locus of movement of the hook portion 68, and thus allowing the movement of the slider 22.

After the slider 22 has moved, the ratchet portion 110C which is pressed by the flexible tape 40 holds the pin 92 out of the locus of movement of the hook portion 68. However, when the slider 22 returns to the webbing fastening position shown in FIG. 12, the ratchet portion 110C enters the elongated opening 50, so that the pin 92 is interposed in the locus of movement of the hook portion 68 again.

In this case, the length A of the ratchet portion 110C is preferably made so large that it cannot enter the openings 42 in the flexible tape 40.

A fifth embodiment of the present invention is shown in FIGS. 14 through 17. In this embodiment, the slide block 84 and the latch pawl 64 used in the first embodiment are omitted, but a lock pin 570 is provided between leg plates 78 of a ratchet member 74A, and the lock pin 570 is able to be made of metal or the like. The lock pin 570 is engageable with the hook portion 68 as the same manner in the second embodiment shown in FIG. 9 through FIG. 11.

A control pin 580 provided to a detector element 578 of a limit switch 576 is inserted in a guide bore 82 of the ratchet member 74A. The detector element 578 is longitudinally slidably disposed to the limit switch 576 through a hole formed in a housing 56A, and the control pin 580 is transversely extended from the detector element 578.

Figure 14:
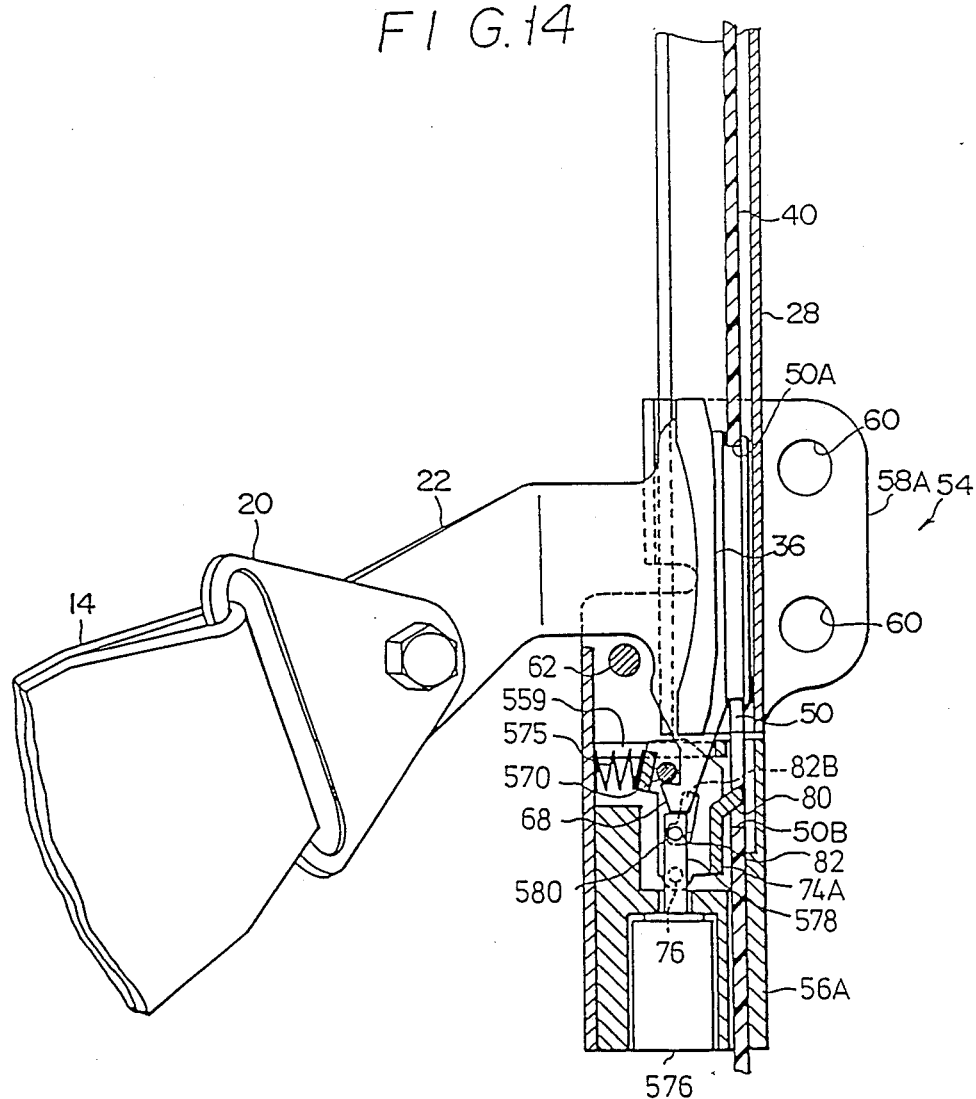
FIG. 14 is a partially sectional side view of an essential part of a fifth embodiment, which corresponds to FIG. 3 of the first embodiment.
Figure 15:
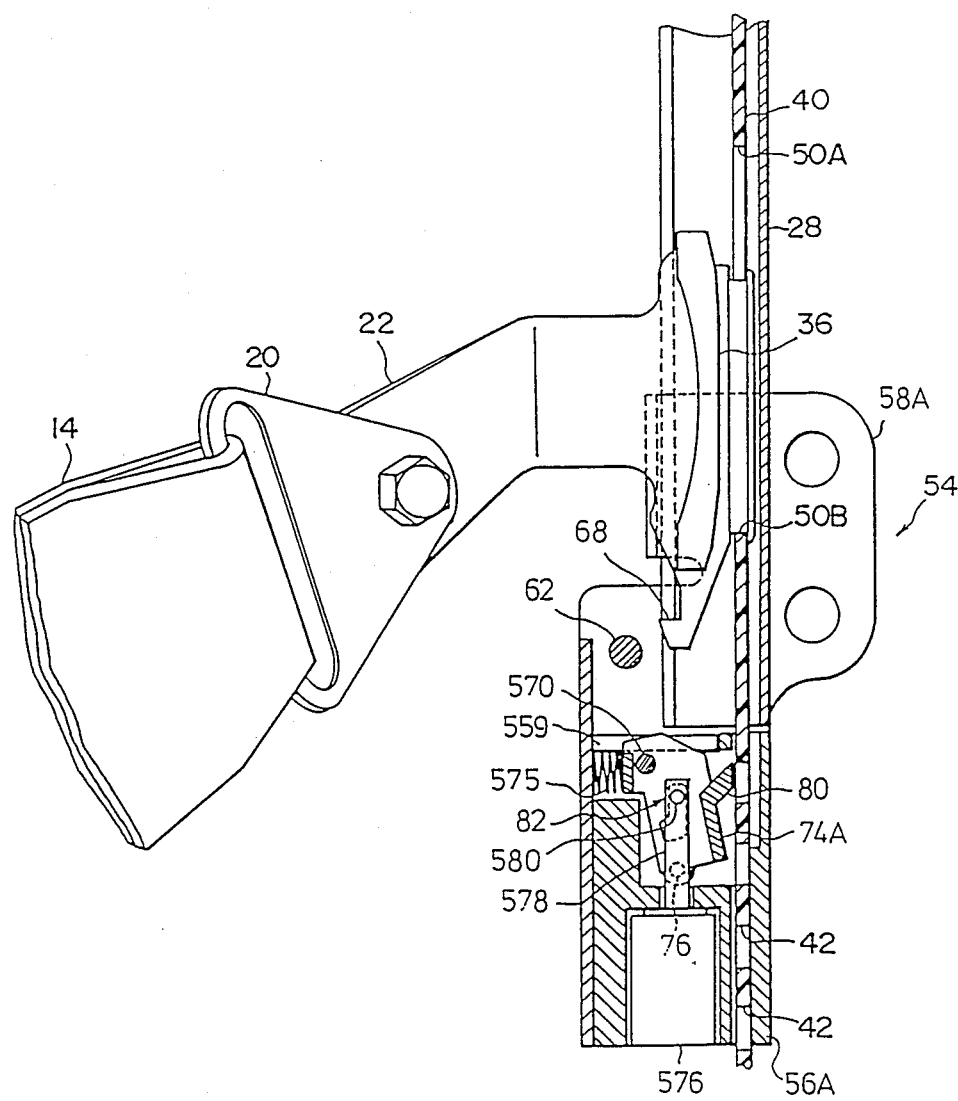
FIG. 15 is a view employed to explain the operation of the essential part of the fifth embodiment shown in FIG. 14, which corresponds to FIG. 8.
Figure 16:
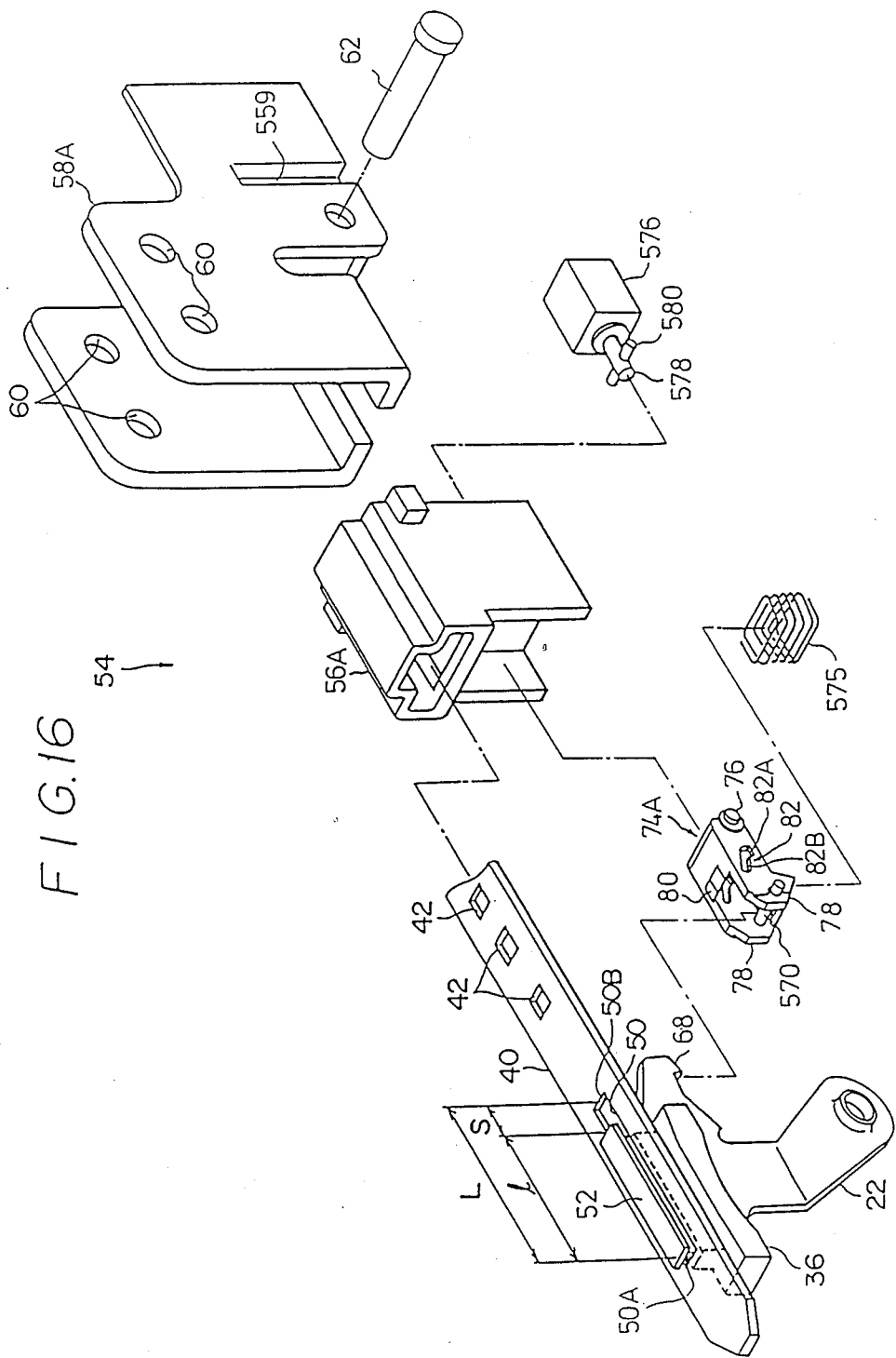
FIG. 16 is an exploded perspective view of the essential part of the fifth embodiment.

In this embodiment, as shown in FIGS. 14 and 15, a compressed coil spring 575 urges a pawl 80 of the ratchet member 74A to a direction of the flexible tape 40.

Accordingly, in the embodiment, as the slider 22 pushes in the detector element 578 to the limit switch 576 at a stroke end portion resistant to a spring member which is not shown in the drawings, but provided in the limit switch 576, a driving motor for the flexible tape is stopped by the limit switch, and the control pin 580 is inserted in a larger width portion 82A of the guide bore 82 of the ratchet member 74A, and then a pawl portion 80 of the ratchet member 74A is gotten into the longitudinal opening 50 of the flexible tape by the urging force of the coil spring 575.

At this condition, even though external force is upward added to the slider 22 from the webbing 14 in FIG. 14, the external force is received by the body of the vehicle through the housing 56A and projected portions 559 of a bracket 58A.

At the time of automatically setting the webbing to an occupant, referring FIG. 14, when the flexible tape 40 is upward driven, the pawl portion 80 is withdrawn by the flexible tape 40 from the locus of movement thereof, and the pin 570 is disengaged from the hook portion of the slider 22, then the slider 22 is delayingly moved in accordance with the relative movement with the flexible tape 40. At this stage, the control pin 580 of the detector element 578 is slidingly received in a smaller width portion 82B of the guide bore 82, and the ratchet member 74A is prevented from pivotal movement.

The pin 570 is not limited to around shape in a cross-sectional view, and can be formed to any shape. Moreover, the pin 570 can integrally formed with the ratchet member 74A by diecasting. The compressed coil spring 575 can be replaced with any other leaf spring or the like.

The anchor pin 62 used in each embodiments can be omitted, and substitutionally the bracket 58 is able to be constituted so as to receive by itself the large force of the webbing 14 which may occur in the emergency of the vehicle.

It should be noted that the drive means employed in the present invention is not necessarily limitative to a continuous member such as a flexible tape, and any other type of drive means may be employed.

As has been described above, the automatic seatbelt system for a vehicle according to the present invention comprises: a guide rail laid on the body of the vehicle; a slider retaining a webbing and adapted to be movable along the guide rail between a position at which the webbing is fastened to the body of an occupant (hereinafter referred to as a "webbing fastening position") and a position at which the webbing is unfastened therefrom (hereinafter referred to as a "webbing unfastening position"); drive means adapted to move along the guide rail in such a manner as to appply driving force to the slider, the drive means being movable relative to the slider by a predetermined amount along the guide rail; and retainer means adapted such that, in response to the movement of the slider to the webbing fastening position, the retainer means is brought into a first state wherein it can inhibit the movement of the slider toward the webbing unfastening position, and in response to the above-described relative movement which occurs when the drive means moves toward the webbing unfastening position from the webbing fastening position, the retainer means is brought into a second state wherein it allows the slider to move toward the webbing unfastening position. Accordingly, the retainer means for preventing the slider from moving when the occupant has the webbing fastened can be simplified in arrangement and reduced in size, advantageously.

We claim:

1. An automatic seatbelt system for a vehicle comprising:
(a) a guide rail attached along the body of the vehicle;
(b) a slider for retaining a webbing and adapted to be movable along said guide rail between a position at which said webbing is fastened to the body to an occupant and a position at which said webbing is unfastened therefrom;
(c) drive means disposed to engage with said slider so that the drive means is slidably movable relative to said slider by a predetermined amount along said guide rail;
(d) retainer means for releasably retaining said slider in a webbing fastening position, said retainer means including a head provided on the slider and slidably engaged with the driving means, a hook portion formed at an end of the slider, a locking apparatus disposed opposite to the hook portion for releasable engagement therewith, and a ratchet member pivotably disposed and having a pawl being engageable with said driving means for actuating said locking apparatus into and out of engagement with said hook portion, said retainer means being adapted such that, in response to the movement of said slider to said webbing fastening position, said retainer means is brought into a first state wherein it can inhibit the movement of said slider toward said webbing unfastening position, and in response to said slidable relative movement which occurs between said slider and said driver means when said drive means moves toward said webbing unfastening position from said webbing fastening position, said retainer means is brought into a second state wherein it allows said slider to move toward said webbing unfastening position; and (e) limit switch means having a detector element and a control pin provided on said detector element, and guide bore means formed to said ratchet member, said control pin being slidably disposed in said guide bore whereby, movement of said ratchet member is controlled by relative position of said control pin and guide bore for engaging or releasing both said locking pin and hook portion, and when said slider is at said webbing fastening position, it is inhibited from moving along said guide rail, and wherein said drive means prevents said retainer means from engaging the slider when said slider is unfastened.

2. An automobile seatbelt system according to claim 1, wherein said locking apparatus is a pin disposed on said ratchet member.

3. An automobile seatbelt system according to claim 2, wherein said pin is secured between leg plate portions of said ratchet member.

4. An automatic seatbelt system according to claim 1, wherein said drive means includes a continuous member accommodated in said guide rail and movable in the longitudinal direction thereof, and said continuous member has an elongated opening for receiving a part of said slider in order to apply driving force thereto.

5. An automatic seatbelt system according to claim 4, said pawl of the ratchet member is engageable in said elongated opening.

6. An automatic seatbelt system according to claim 2, wherein said ratchet member is adapted such that, when said slider is at said webbing fastening position, said ratchet member is moved by means of biasing force so as to position said pin in the locus of movement of said hook portion for engaging therebetween, thereby inhibiting said slider from moves toward said webbing unfastening position.

7. An automatic seatbelt system according to claim 6, wherein said retainer means further has a release section adapted to cause said pin to move out of the locus of movement of said hook portion against the biasing force in response to the relative movement occurring when said continuous member moves toward said webbing unfastening position, thereby allowing said slider to move toward said webbing unfastening position.

8. An automatic seatbelt system according to claim 7, wherein said retainer means further includes a hollow housing disposed at an end of said guide rail on the side thereof which is closer to said webbing fastening position, said ratchet member is pivotally supported within the hollow portion of said housing and, has a spring adapted to bias said ratchet member so as to move the pawl in the locus of movement of said hook portion.

9. An automatic seatbelt system according to claim 1, wherein said guide bore means has a larger width portion where said control pin is situated, then said ratchet member is pivotably movable, and a smaller width portion where said control pin is situated, then said ratchet is prevented from pivotable movement.

10. An automatic seatbelt system according to claim 1, wherein said detector element is axially movable with contact to said slider through said ratchet member.

11. An automatic seatbelt system according to claim 10, wherein said control pin is rectangularly extended from said detector element.

12. An automatic seatbelt system according to claim 2, wherein said pin is made from metal material.

13. An automatic seatbelt system according to claim 12, wherein said pin and said ratchet member are integrally formed.

* * * * *